United States Patent
Miyazaki et al.

(10) Patent No.: US 7,941,667 B2
(45) Date of Patent: May 10, 2011

(54) ELECTRONIC DOCUMENT AUTHENTICITY GUARANTEE METHOD, AND ELECTRONIC DOCUMENT DISCLOSURE SYSTEM

(75) Inventors: Kunihiko Miyazaki, Yokohama (JP); Yasuo Hatano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 964 days.

(21) Appl. No.: 11/482,104

(22) Filed: Jul. 7, 2006

(65) Prior Publication Data

US 2007/0106908 A1 May 10, 2007

(30) Foreign Application Priority Data

Nov. 4, 2005 (JP) ................................. 2005-320315

(51) Int. Cl.
*H04L 9/32* (2006.01)
(52) U.S. Cl. ........................... 713/176; 713/178; 726/30
(58) Field of Classification Search .......... 713/176–178, 713/181; 726/30
See application file for complete search history.

(56) References Cited

U.S. PATENT DOCUMENTS

| | | | | |
|---|---|---|---|---|
| 4,309,569 | A * | 1/1982 | Merkle | 713/177 |
| 6,151,676 | A * | 11/2000 | Cuccia et al. | 713/176 |
| 6,341,349 | B1 * | 1/2002 | Takaragi et al. | 713/168 |
| 6,363,154 | B1 * | 3/2002 | Peyravian et al. | 380/283 |
| 6,671,805 | B1 * | 12/2003 | Brown et al. | 713/176 |
| 6,701,434 | B1 * | 3/2004 | Rohatgi | 713/168 |
| 6,826,687 | B1 * | 11/2004 | Rohatgi | 713/171 |
| 7,174,460 | B2 | 2/2007 | Horita et al. | |
| 7,526,645 | B2 * | 4/2009 | Miyazaki et al. | 713/167 |
| 2002/0040431 | A1 | 4/2002 | Kato et al. | |
| 2002/0184504 | A1 * | 12/2002 | Hughes | 713/177 |
| 2003/0145197 | A1 | 7/2003 | Lee et al. | |
| 2004/0255116 | A1 | 12/2004 | Hane et al. | |
| 2006/0034453 | A1 * | 2/2006 | Liu | 380/28 |
| 2006/0136728 | A1 * | 6/2006 | Gentry et al. | 713/176 |

FOREIGN PATENT DOCUMENTS

EP 1 498 799 A2 1/2005
JP 2001-167086 A 6/2001

OTHER PUBLICATIONS

Ron Steinfeld, Laurence Bull, Yuliang Zheng, Published Apr. 28, 2003.*

(Continued)

*Primary Examiner* — Taghi T Arani
*Assistant Examiner* — Justin T Darrow
(74) *Attorney, Agent, or Firm* — McDermott Will & Emery LLP

(57) ABSTRACT

A need exists for a technology for guaranteeing the authenticity of an electronic document, and an information disclosure system, which can guarantee the authenticity of a disclosed document and delete information regarded as inappropriate for disclosure. An electronic document is divided into components, and a random number generated from a seed value is concatenated to each of the components. A hash value is calculated for each of the components with which the random numbers have been concatenated. The calculated hash values are further concatenated using a hash function to generate data to which an digital signature is applied.

4 Claims, 10 Drawing Sheets

OTHER PUBLICATIONS

Robert Johnson, David Molnar, Dawn Song, David Wagner, B. Preneel (Ed.): CT-RSA 2002, LNCS 2271, pp. 244-262, 2002, Springer-Verlag.*

Bruce Schneier, "Applied Cryptography: Protocols, Algorithms, and Source Code in C," Second Edition, Oct. 18, 1995, pp. 483-502, John Wiley & Sons.

Ron Steinfeld, et al., "Content Extraction Signatures," The 4th International Conference on Information Security and Cryptology, Dec. 6-7, 2001m pp. 285-304, vol. 2288 of LNCS, Springer Verlag.

Robert Johnson, et al., "Homomphoric Signature Schemes," Proceedings of the RSA Security Conference Cryptographers Track, Feb. 2002, pp. 244-262.

Kunihiko Miyazaki, et al., "Digitally Signed Document Sanitizing Scheme with Disclosure Condition Control," IEICE Transactions on Fundamentals of Electronics, Communications and Computer Sciences, Jan. 2005, pp. 239-249, vol. E88-A, No. 1, The Institute of Electronics, Information and Communication Engineers.

European Search Report issued in corresponding European Patent Application No. 06013869.0-2413, dated Mar. 20, 2007.

* cited by examiner

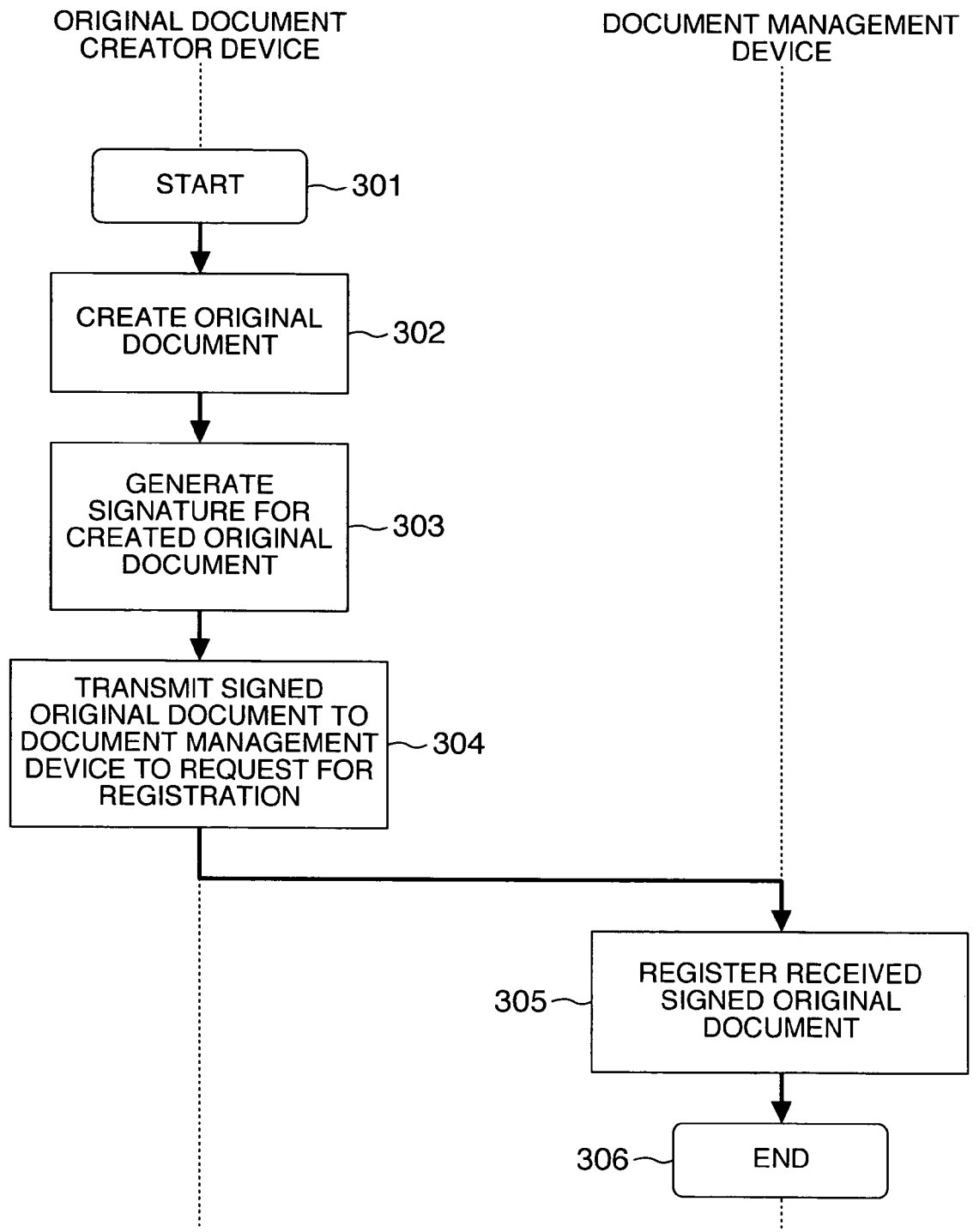

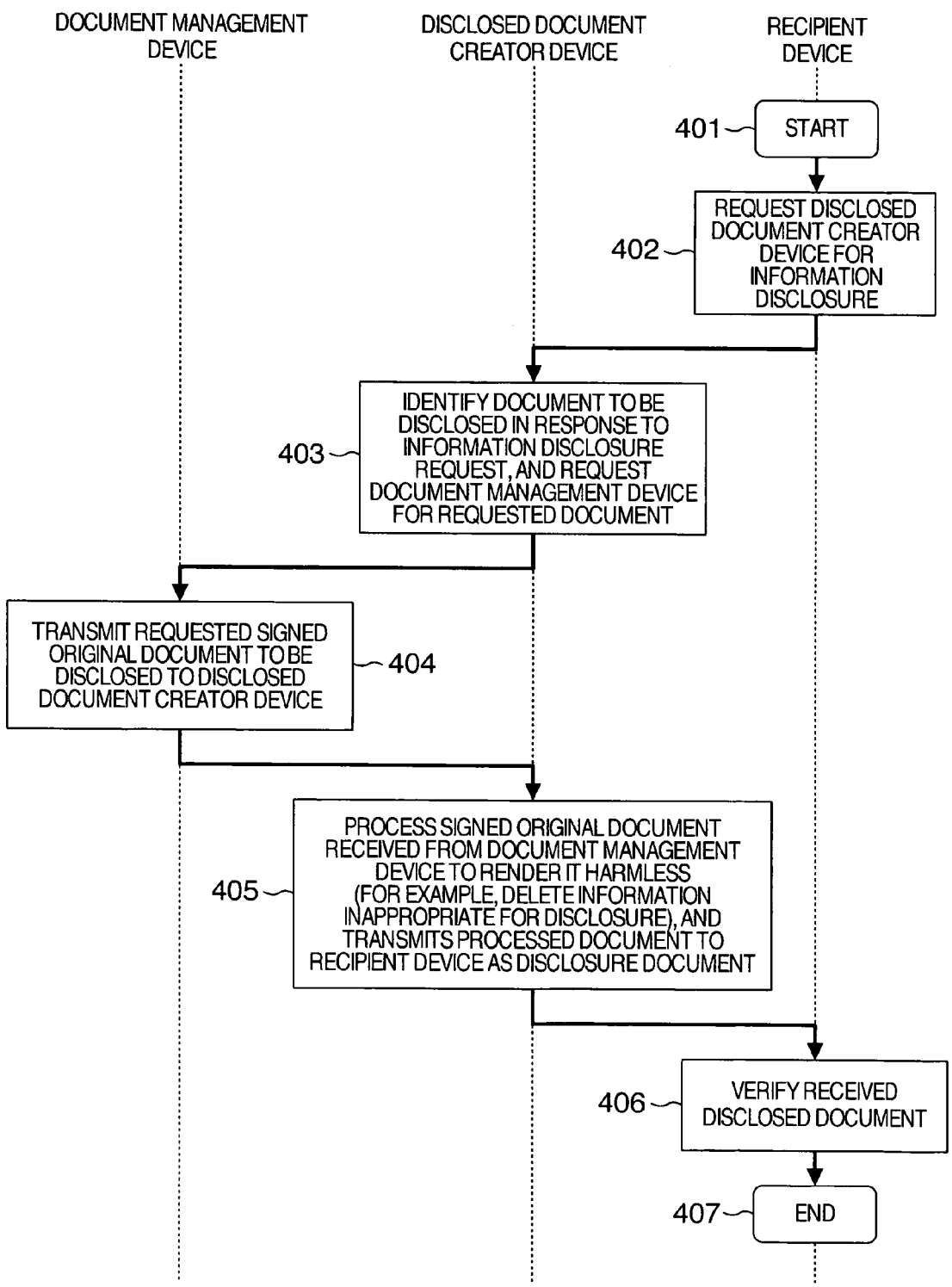

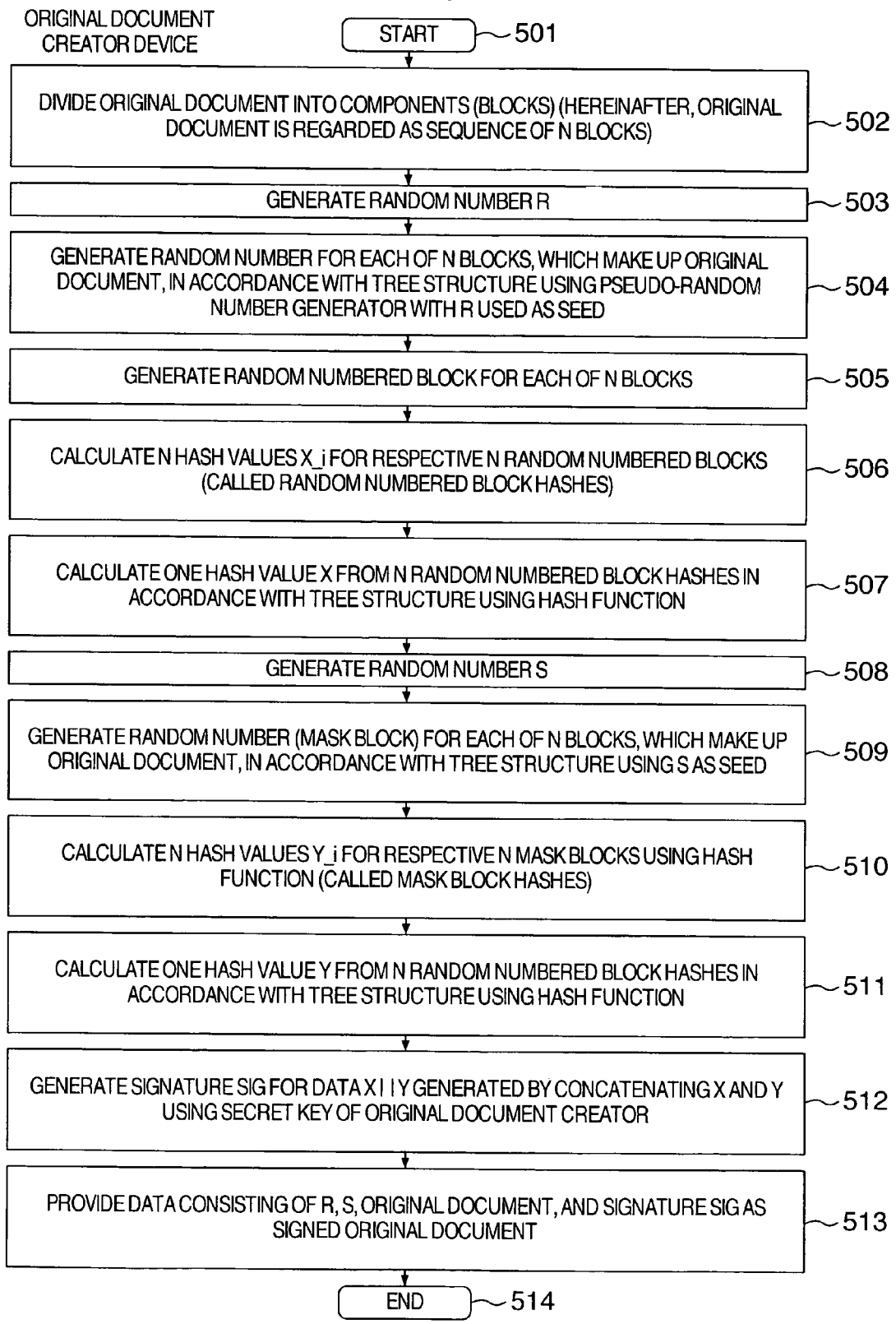

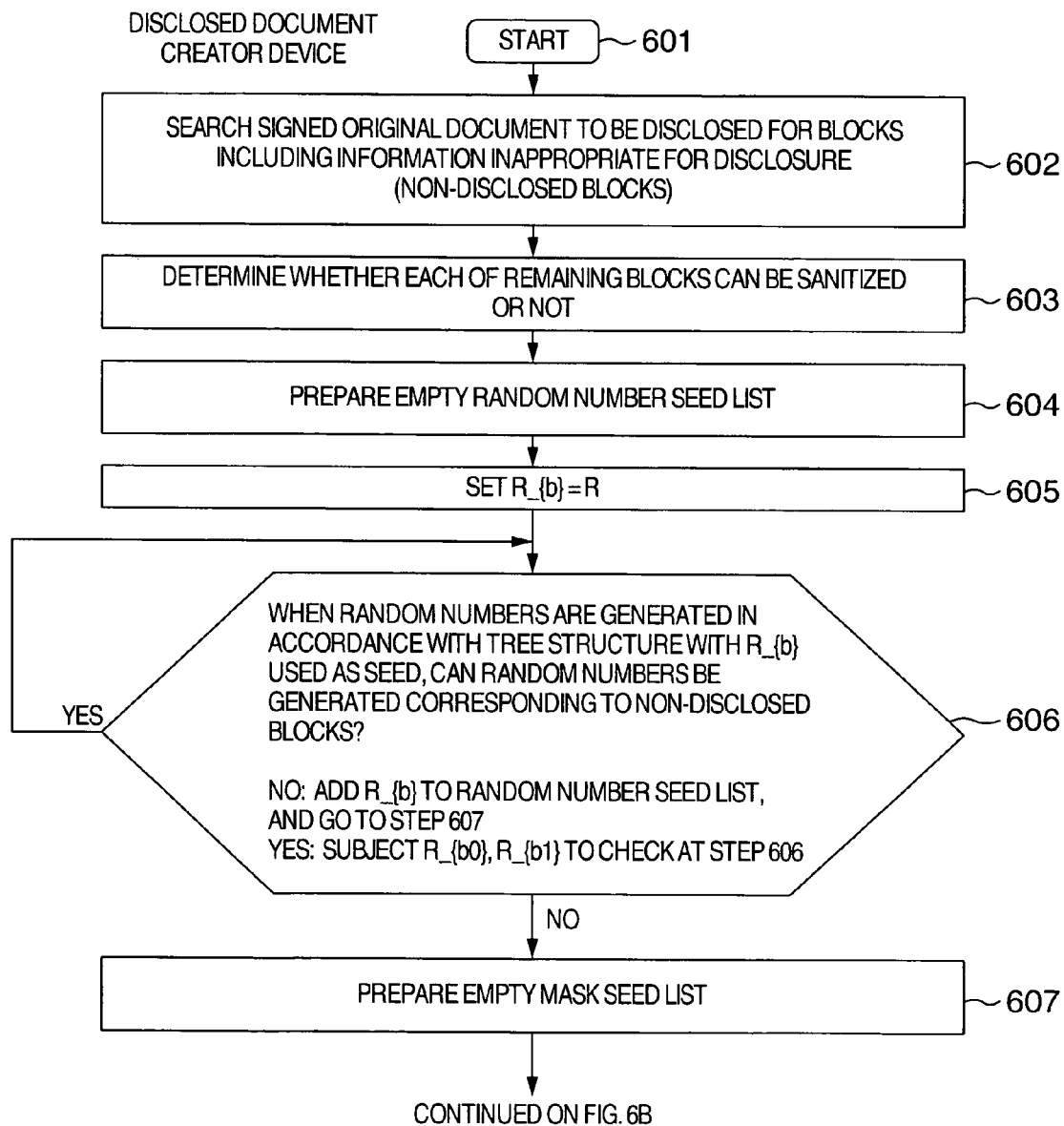

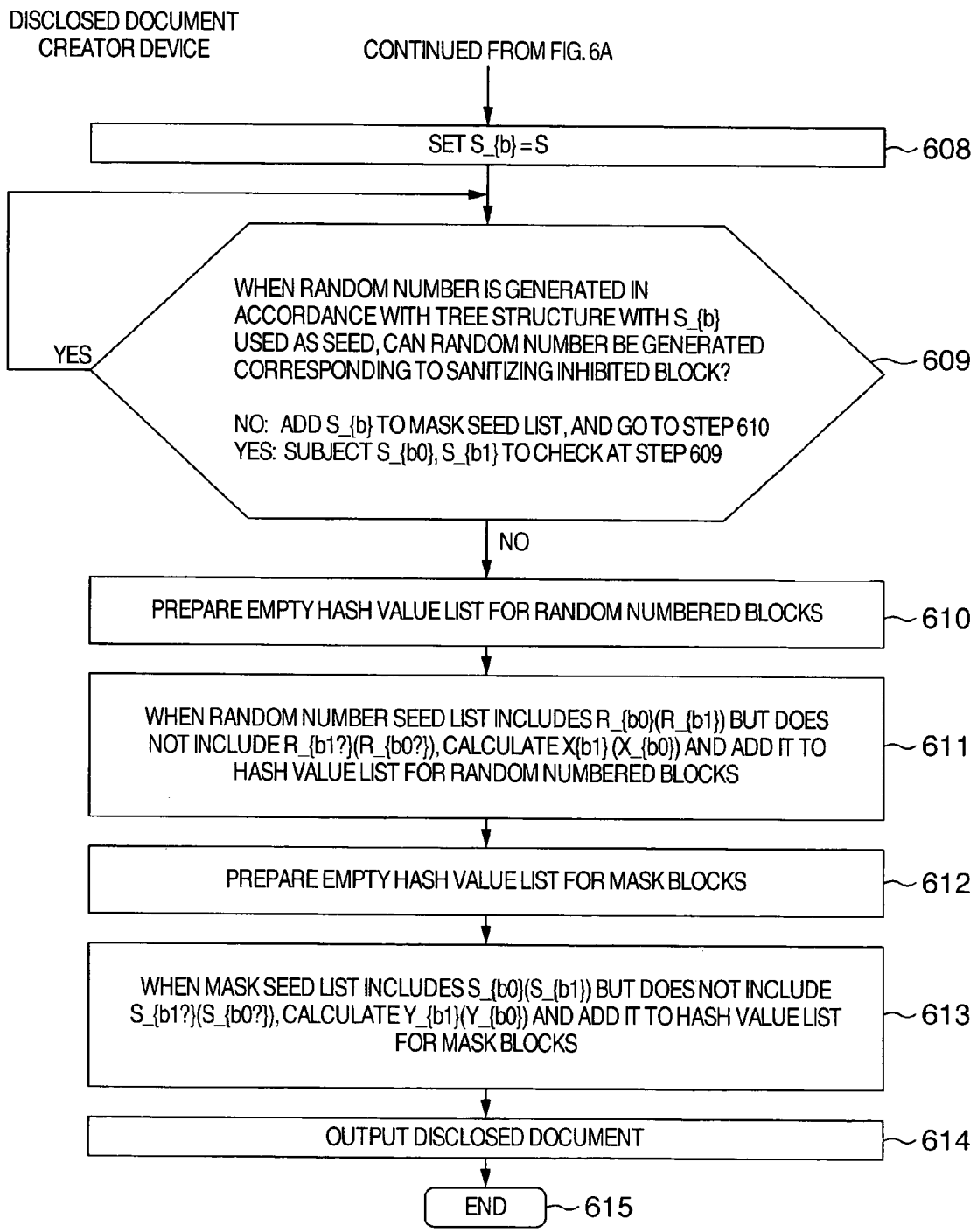

ELECTRONIC DOCUMENT AUTHENTICITY GUARANTEE METHOD, AND ELECTRONIC DOCUMENT DISCLOSURE SYSTEM

INCORPORATION BY REFERENCE

This application claims priority based on a Japanese patent application, No. 2005-320315 filed on Nov. 4, 2005, the entire contents of which are incorporated herein by reference.

BACKGROUND OF THE INVENTION

The present invention relates to electronic data authenticity guarantee technologies.

Conventionally, the authenticity of electronic data such as electronic documents is guaranteed using an digital signature (also called "electronic signature") technology (see, for example, Bruce Schneier, "Applied Cryptography: Protocols, Algorithms, and Source Code in C, Second Edition," John Wiley & Sons, (Oct. 18, 1995), pp. 483-502 (hereinafter called "Document 1").

There is also a technology for digitally signing each of entities in a structured electronic document to retrieve the structured document available for reference and editing (see, for example, JP-A-2001-167086 (FIG. 17) (hereinafter called "Document 2").

Further, with another technology (see, for example, Ron Steinfeld, Laurence Bull, Yuliang Zheng, "Content Extraction Signatures," in International Conference on Information Security and Cryptology ICISC 2001, volume 2288 of LNCS, pp. 285-304, Berlin, 2001, Springer-Verlag, (2001) (hereinafter called "Document 3"), from a document owned by a owner and previously signed by a signer different from the owner, part of the document permitted by the signer can be deleted from the document, the signed document can be validated after the deletion.

SUMMARY OF THE INVENTION

The current digital signature technology, which is important for supporting the security of electronic documents, is designed to sense an alteration of even one bit to an electronic document. While this property is very useful from a viewpoint of protecting electronic documents from tampering made by unauthorized persons, but can be an obstruct, on the contrary, from a viewpoint of effective utilization of electronic documents because any processing cannot be permitted to electronic documents.

The foregoing problem is typically shown in a scenario in which electronic documents are utilized under freedom of information promoted by administrative organs or the like. For example, the digital signature may be utilized in the following use environment.

Specifically, in an administrative organ, a job-related document created by an officer is stored after its creator has been clarified, and electronically signed for preventing the document from being tampered. When this document is disclosed under the freedom of information act, personal information and national security information described thereon are partially concealed by such treatments as deletion, black out and the like before the document is disclosed.

The conventional digital signature technology, however, is not capable of confirming the authenticity of a document disclosed in line with the sequence of procedures mentioned above, i.e., who is the creator of the document, whether the disclosed document is the same as the originally created document, and the like. This is because part of the document has been deleted in course of the information disclosure. Accordingly, even malicious tampering and deletion of personal information intended to protect privacy information are regarded as similar activities in a sense that alteration has been added to a signed document. As a result, the conventional digital signature technology, even if utilized, cannot satisfy both of two critical security requirements, i.e., "guaranteed authenticity of released document" and "protection of privacy information," one of which cannot but be given up.

Considering that the freedom of information system is intended for administrative organs to accomplish accountability, it is desirable that the identity can be verified with an original administrative document even from a document for disclosure from which personal information and the like have been deleted.

Document 2, though disclosing a technology related to how to correspond data in each entity of an electronic document to digital signature data, does not disclose that the authenticity of an original document is confirmed without changing an original digital signature after editing of the electronic document.

It is therefore desirable to have a technology for guaranteeing the authenticity of an electronic document, which permits proper alterations to an authenticity guaranteed document, in other words, a technology which can confirm the authenticity of an original document, without changing an original digital signature, after editing the electronic document.

With the technology disclosed in Document 3, from a document owned by a owner and previously signed by a signer different from the owner, part of the document permitted by the signer can be deleted from the document, the signed document can be validated after the deletion, but Document 3 does not disclose a technology suitable for the freedom of information system.

Preferably, in regard to freedom of information, for example, a person who created a disclosed document, different from a signer, determines a disclosed portion of an original document created by the signer, or the contents of which has been confirmed by the signer, deletes information in portions regarded as improper for disclosure, and discloses portions which should be disclosed in such a manner that third parties are allowed to further delete some of the disclosed portions or are prevented from such deletion, in accordance with the contents of the disclosed portions. Document 3, however, does not disclose a technology which allows a disclosed document creator to select permission or inhibition of further alterations to the document by a third party.

Robert Jonson, David Molnar, Dawn Song, David Wagner, "Homomorphic Signature Schemes," in Proceedings of the RSA Security Conference Cryptographers Track, pp. 244-262 February 2002 (hereinafter called "Document 4") discloses another method which permits partial deletion from a document previously signed by a signer. According to this technology, the data size of the signature can be reduced, as compared with the technology disclosed in Document 3. However, like Document 3, Document 4 does not disclose a technology which allows a disclosed document creator to select permission or inhibition of further alterations to the document by a third party.

Accordingly, a need exists for an information disclosure method and system which are adapted to a form of utilizing an authenticity guaranteed document which has been properly altered, and to requirements which should be met for utilization.

Kunihiko MIYAZAKI, Mitsuru IWAMURA, Tsutomu MATSUMOTO, Ryoichi SASAKI, Hiroshi YOSHIURA, Satoru TEZUKA, Hideki IMAI, "Digitally Signed Document Sanitizing Scheme with Disclosure Condition Control,"IEICE Transactions on Fundamentals of Electronics, Communications and Computer Sciences 2005 E88-A(1): 239-246 (2005) (hereinafter called Document 5, the entire contents of which is incorporated herein by reference for all purposes) discloses a technology which permits a disclosed document creator to select permission or inhibition of further alterations to the document by a third party, but does not disclose a method of reducing the data size of a signature.

Accordingly, a need exists for a method of permitting a disclosed document creator to select permission or inhibition of further alternations by a third party and additionally reducing the data size of a signature.

The present invention provides an electronic document authenticity guarantee technology and a document management system which permit proper alterations to be made to a document subjected to guarantee of authenticity.

In one aspect, the present invention provides an electronically signing method which comprises the steps of dividing an electronic document into components, generating a random number for each of the components from one or a plurality of seeds using a pseudo-random number generator, concatenating each component and the random number associated thereto, calculating hash values for the components, with which the random numbers are concatenated, using an cryptographic hash function, further concatenating the calculated hash values using an cryptographic hash function identical to or different from the cryptographic hash function, and applying an digital signature to the concatenated data.

Specifically, in an electronic document authenticity guarantee method according to the present invention, a creator device divides an electronic document to be guaranteed into a plurality of components, generates a first random number seed value, concatenates a concealment random number to each of the plurality of components, the concealment random number being generated from the first random number seed value for each of the plurality of components using a pseudo-random number generator, calculates a first hash value for each of the components to which the concealment random number has been concatenated using a first cryptographic hash function, calculates a first data from a plurality of the calculated first hash values using a second cryptographic hash function, generates a second random number seed value different from the first random number seed value, generates mask data random number from the second random number seed value for each of the plurality of components using the pseudo-random number generator, calculates a second hash value for each of the generated mask data random number using a third cryptographic hash function, calculates a second data from a plurality of the calculated second hash values using a fourth cryptographic hash function, and applies an digital signature to the first data and the second data.

Further, in the electronic document authenticity guarantee method of the present invention, an censor device sets one of non-disclosure, disclosure and sanitizing prohibited, and disclosure and sanitizing allowed, to each of the components, and generates data which includes one or a plurality of first random number seed values capable of generating concealment random numbers corresponding to components which have been set to disclosure and sanitizing prohibited or disclosure and sanitizing allowed, one or a plurality of second random number seed values capable of generating mask data random numbers corresponding to components which have been set to non-disclosure or disclosure and sanitizing allowed, a first hash value calculated from one or a plurality of components set to non-disclosure, and concealment random numbers corresponding to the components, a second hash value calculated from one or a plurality of components set to disclosure and sanitizing prohibited, and mask data random numbers corresponding to the components, components which have been set to disclosure and sanitizing prohibited, and components which have been set to disclosure and sanitizing allowed, and the digital signature.

Further, in the electronic document authenticity guarantee method according to the present invention, a verifier device generates concealment random numbers corresponding to the components set to disclosure and sanitizing prohibited or the components set to disclosure and sanitizing allowed from the one or plurality of random number seeds capable of generating concealment random numbers corresponding to the components set to disclosure and sanitizing prohibited or the components set to disclosure and sanitizing allowed using the pseudo-random number generator, and concatenating the generated concealment random numbers to the components set to disclosure and sanitizing prohibited or the components set to disclosure and sanitizing allowed, calculates a third data from the first hash values calculated for the components set to disclosure and sanitizing prohibited or the components set to disclosure and sanitizing allowed, to which the concealment random numbers are concatenated, using the first cryptographic hash function, and first hash values calculated from the one or plurality of components set to non-disclosure, and concealment random numbers corresponding to the components, using the second hash function, generates mask data random numbers corresponding to the components set to non-disclosure or disclosure and sanitizing allowed from the one or plurality of random number seeds capable of generating mask data random numbers corresponding to the components set to non disclosure or the components set to disclosure and sanitizing allowed, using the pseudo-random number generator, calculates second hash values calculated from the generated mask data random numbers using the third cryptographic hash function, and second hash values calculated from the one or plurality of components set to disclosure and sanitizing prohibited, and mask data random numbers corresponding to the components, using the fourth hash function, and verifies the digital signature using the third data and the fourth data.

Accordingly, the present invention provides an electronic document authenticity guarantee method which is capable of verifying the authenticity of an electronic document even after partial information has been deleted therefrom, and is capable of reducing data size. The present invention also provides an information disclosure system which is capable of guaranteeing the security of important information such as personal information, and the authenticity of a disclosed document.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram illustrating a processing flow executed when an original document is created and deposited in the embodiment.

FIG. 4 is a diagram illustrating a processing flow executed when information is disclosed in the embodiment.

FIG. 5 is a diagram illustrating a processing flow of a signature generation program 222 in accordance with the embodiment.

FIGS. 6A and 6B are diagrams illustrating a processing flow of a disclosed document creation program 230 in accordance with the embodiment.

DETAILED DESCRIPTION OF THE EMBODIMENTS

Figure 1:
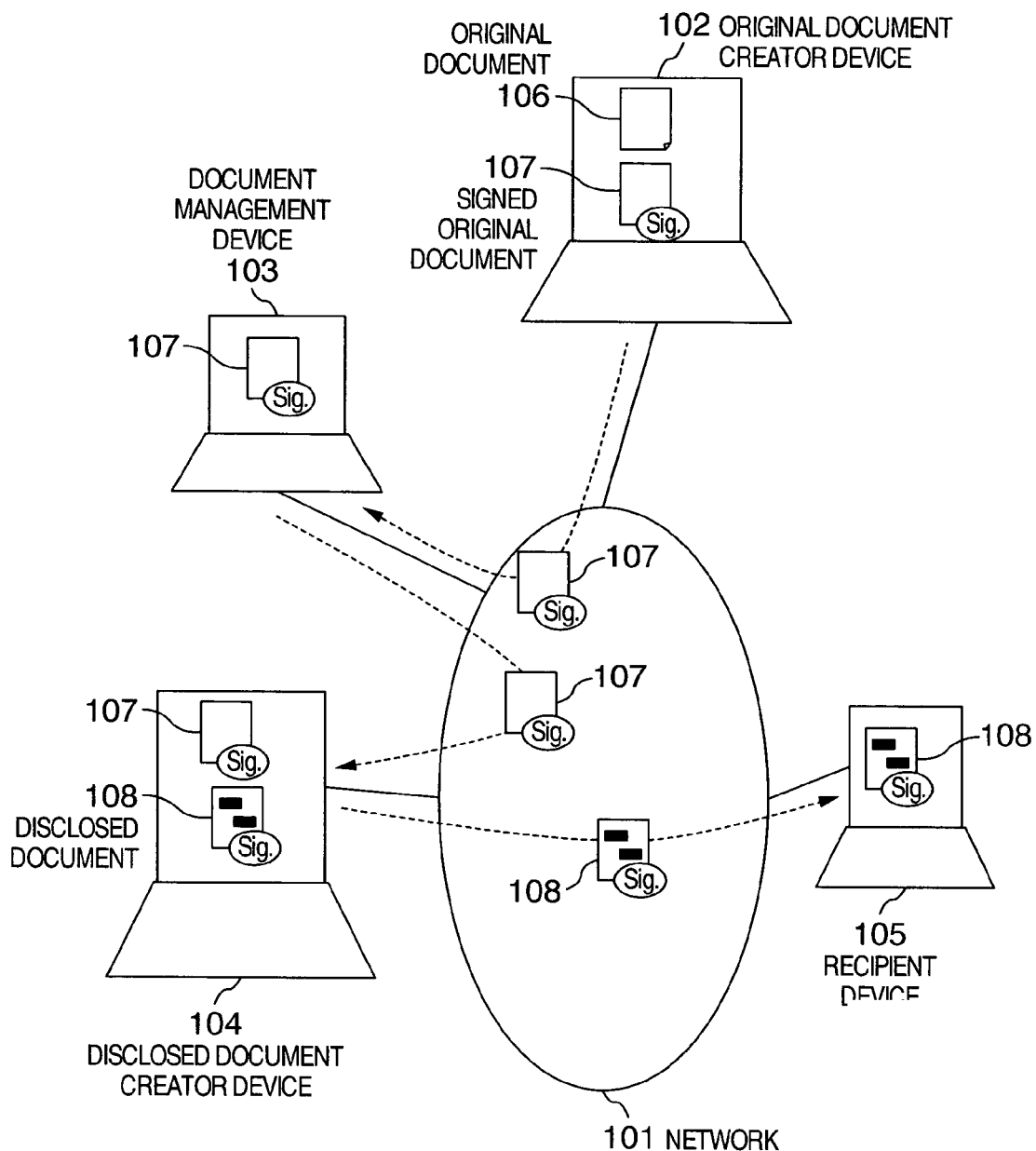
FIG. 1 is a diagram generally illustrating the configuration of a network system which implements one embodiment of the present invention.

FIG. 1 is a schematic diagram generally illustrating the configuration of a system in a plurality of embodiments which are applied to an information disclosure system. While the present invention is applied to an information disclosure system in an administrative organ in an example given below, the present invention can also be applied to information disclosure systems in organizations other than administrative organs or for personal use.

As illustrated, the system comprises an original document creator device 102, a document management device 103, and a disclosed document creator device 104, which are utilized by officers of an administrative organ dedicated to information disclosure, and a recipient device 104 which is utilized by civilians who can request for information disclosure, and verify documents. These devices are interconnected through a network 101.

In the exemplary embodiment described below, the original document creator device 102, document management device 103, and disclosed document creator device 104, which are utilized by officers of an administrative organ, and the recipient device 105, which is utilized by civilians, are connected to the same network 101, but a different connection topology may be employed for the system. For example, the original document creator device 102, document management device 103, and disclosed document creator device 104, utilized by officers of the administrative organ, may be connected to LAN (Local Area Network) installed in the administrative organ, and this LAN may be connected to the network 101, to which the recipient device 105, utilized by civilians, is connected, through a gateway server. Such a connection topology is preferably selected from a viewpoint of information security, because the LAN of the administrative organ can be protected by the gateway server from attacks from the external network 101 such as unauthorized accesses and the like.

The original document creator device 102 is utilized by an original document creator, who is an officer of the administrative organ, to create an administrative document (document created for his job) in the form of electronic data, digitally sign the created administrative document, and subsequently request the document management device 103 for a signed administrative document. In the embodiment described below, an administrative document signed by an original document creator is called the "original document 106." Also, in the embodiment shown below, the original document 106 is created and signed on the original document creator device 102, but the creation of the original document 106 and the signing on the original document 106 may be done on different devices, unlike the above, such that the original document 106 can be passed between these devices through the network 101 or using a portable storage medium.

The document management device 103 stores a signed original document 107 created on the original document creator device 102 in response to a request from the original document creator device 102. Also, in response to a request from the disclosed document creator device 104, the document management device 103 transmits a signed original document 107, which has been previously stored and is to be disclosed, to the disclosed document creator device 102. When the document management device 103 accepts a request for storage from the original document creator device 102 and a request for transmission of a disclosed document from the disclosed document creator device 104, accesses are preferably controlled through appropriate user authentication and the like from a viewpoint of information security.

Upon receipt of an information disclosure request through manipulations on the recipient device 105 by a civilian or the like, who is a user of the recipient device 105, the disclosed document creator device 104 searches for a document to be disclosed in accordance with the information disclosure request, and requests the document management device 103 to transmit a signed original document 107 which is the document to be disclosed. Next, the disclosed document creator device 104 deletes information inappropriate for disclosure, from a view point of personal information protection and protection of information related to national security, from information contained in the signed original document 107 received from the document management device 103, to create a disclosed document 108, and opens the created disclosed document 108 to the recipient device 105.

In this event, if the signature added to the original document 106 has been generated by a conventional digital signature technology, the signature will be unsuccessfully verified, as is the case with fraudulent tampering found in the original document 106, even if "information inappropriate for disclosure" has been deleted from the original document 106. In this embodiment, the system employs a new digital signature technology which allows the verification of an original document even after inappropriate information has been deleted from the original document.

A method of opening a disclosed document may be arbitrarily designed, and may involve, for example, e-mail transmission, uploading onto a web server operated by the administrative organ or any other organization, and the like. The method of uploading a disclosed document onto a web server is advantageous in that the disclosed information can be viewed by civilians other than the user of the recipient device 105 who has requested for the information disclosure.

In the exemplary embodiment presently shown here, one and the same disclosed document creator device 105 is responsible for acceptance of an information opening request from a civilian, a search for a document to be disclosed, a request to the document management device 103 for a document to be disclosed, creation of the disclosed document 108, and opening of the disclosed document 108 to the public, but a different strategy may be employed instead. For example, another device different from the disclosed document creator device 105 may be dedicated to the acceptance of an information disclosure request from a civilian, a search for a document to be disclosed, and a request to the document management device 103 for a document to be disclosed, while the disclosed document creator device 105 may be dedicated to the creation of a disclosed document 108, and opening of the disclosed document 108 to the public.

The recipient device 105 is utilized by a civilian, who is a user, for requesting the administrative organ for information disclosure and verifying the authenticity of a disclosed document 108 as a result of the request. The recipient device 105 transmits information required to identify a document to be disclosed to the disclosed document creator device 104 for requesting the information disclosure. The recipient device 105 also verifies whether or not the disclosed document 108 open to the public has the same contents as the original document 106 except for a portion removed from the original document 106 from a viewpoint of information protection (non-disclosed portion).

The recipient device 105 displays or prints the disclosed document 108 open to the public such that the user can view the disclosed document 108, with the non-disclosed portion being blotted out (hereinafter called "sanitized").

In the exemplary embodiment shown here, one and the same recipient device 105 is responsible for a request for information disclosure and for the verification of the disclosed document 108 for authenticity, but a different strategy may be employed instead. For example, a device different from the recipient device 105 may be dedicated to the request for information disclosure, and the recipient device 105 may verify the authenticity of the disclosed document opened to the public as a result of the request.

Figure 2:
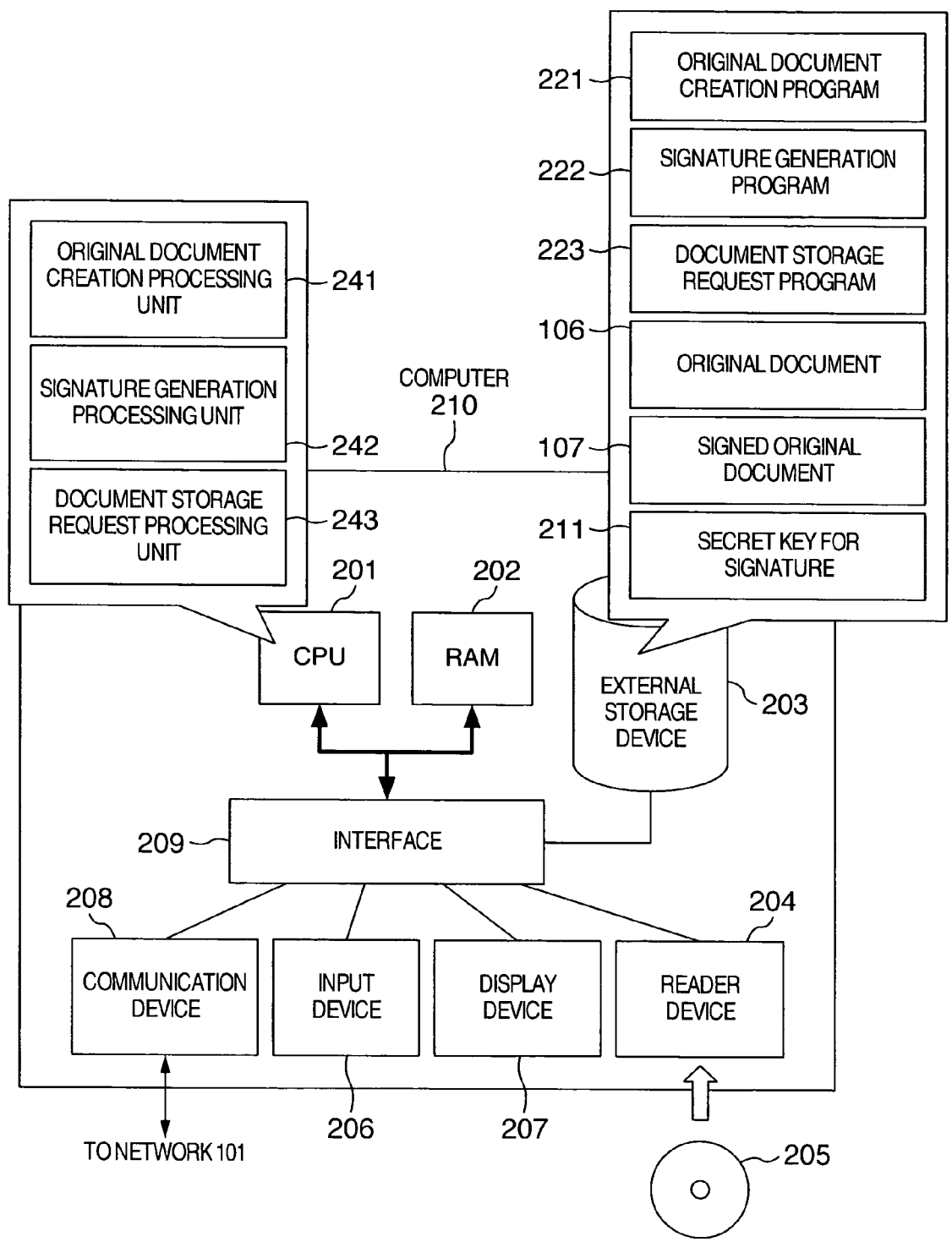
FIG. 2 is a block diagram generally illustrating the configuration of a computer which implements an original document creator device 102 in the embodiment.

FIG. 2 is a block diagram generally illustrating the configuration of the original document creator device 102 in this embodiment.

The original document creator device 102 can be implemented by a computer 210 having a general configuration. The computer 210 comprises a CPU 201, a RAM 202 which functions as a work area of the CPU 201, an external storage device 203 such as a hard disk drive, a reader device 204 for reading data from a portable storage medium 205 such as a CD-ROM, a floppy disk (FD) and the like, an input device 206 such as a keyboard, a mouse and the like, a display device 207, a communication device 208 for communicating with another device through a network, and an interface 209 for governing data transmission/reception among the respective components mentioned above.

The external storage device 203 of the original document creator device 102 stores an original document creation program (PG) 221, a signature generation program 222, and a document storage request program 223. These programs are loaded on the RAM 202 and executed by the CPU 201 to implement an original document creation processing unit 241, a signature generation processing unit 242, and a document storage request processing unit 243, respectively. In addition, the external storage device 203 stores data (original document 106, signed original document 107, secret key 211 for signature) and the like, inputted to and outputted from these respective processing units. It should be noted that the secret key 211 for signature is required to be particularly strictly managed from a viewpoint of security. For this reason, the secret key 211 for signature may be stored in a tamper-resistant device different from the external storage device 203 which stores other data.

The document management device 103, disclosed document creator device 104, and recipient device 105 also have similar configurations to the original document creator device 102. However, an external storage device of the document management device 103 stores a document storage program 224, and disclosed document transmission program 225, as well as stores signed original documents which were requested for deposit. An external storage device of the disclosed document creator device 104 in turn stores an information opening request acceptance program 226, a disclosed document search program 227, a disclosed document request program 228, a disclosed section determination program 229, a disclosed document creation program 230, and a disclosed document opening program 231. Further, an external storage device of the recipient device 105 stores an information opening request program 232, and a disclosed document verification program 233.

In the foregoing description of the embodiment, the respective programs have been previously stored in associated external storage devices 203. Alternatively, the programs may be introduced into the external storage device 203 or RAM 202 through the external interface when they are required through another storage medium such as FD, CD-ROM or the like and the reader device 204, or through the communication device 208 and a network such as the Internet which is a communication medium, or through carrier waves which propagate through a network.

FIG. 3 is a flow diagram generally illustrating a process of creating an administrative document, which is an original document, and depositing the created original document in the document management device in this embodiment. It should be noted that at the time an original document is created and deposited, it cannot always be determined, when an information disclosure request is accepted in the future, which part of the document deposited in the document storage device includes information that should be opened to the public and which part includes information that should not be open to the public. Generally, it is thought that such a decision cannot made in many cases. As can be seen in the figure, the name of a program which executes processing at each step is shown in parenthesis within the step. An original document creation/storage flow (executed by the original document creator device 102) starts at 301. An original document is created (302) (original document creation program 221). A signature is generated for the created original document (signature generation program 222) (303). The signed original document is transmitted to the document management device 103, and a request is made for registering the signed original document in the document management device 103 (document storage request program 223) (processing executed by the document management device 103) (304). The received signed original document is registered (document storage program 224) (305). The original document creation/storage flow terminates at 306.

FIG. 4 is a flow diagram generally illustrating a process of receiving an information opening request from a civilian and opening information to the public in this embodiment. As can be seen in the figure, the name of a program which executes processing at each step is shown in parenthesis within the step. An information disclosure flow starts at 401 (processing executed by recipient device 105). For requesting information disclosure, the recipient device 105 transmits information to the disclosed document creator device 104 for identifying a range of information which the civilian wishes to view (402). The disclosed document creator device 104 receives the information for identifying the range of information which the civilian wishes to view (information disclosure request acceptance program 226), searches for a document to be disclosed based on the information which identifies the range (disclosed document search program 227), and requests the document management device 103 for the document (disclosed document request program 228) (403). The document management device 103 transmits a requested signed original document to be disclosed to disclosed document creator device 104 (disclosed document transmission program 225) (404) The disclosed document creator device 104 checks the contents of the received signed original document against a previously determined information disclosure policy for confirmation, determines a section appropriate for disclosure (disclosed section determination program 229), creates a disclosed document with concealment of information inappropriate for disclosure such as personal information, information related to national security, and the like in order to prevent such information from leaking (disclosed document creation program 230), and transmits the disclosed document to the recipient device 105 (disclosed document disclosure program 231) (405). The recipient device 105 verifies the authenticity of the received disclosed document (disclosed document verification program 233) (406). The information disclosure flow terminates at 407.

In the information disclosure system outlined above, special attention should be paid to the compatibility of the guaranteed authenticity of the disclosed document with the deletion of information inappropriate for disclosure.

If a disclosed document is handled in the same mode as an original document without fail, an original document creator may apply a known digital signature technology to previously sign the original document, permitting a recipient to confirm the authenticity of the disclosed document (the same data as the original document in this case) by applying the known digital signature technology.

However, in the information disclosure system as described in this embodiment, an original document is not always the same as a disclosed document. This is because the original document can contain information inappropriate for disclosure (for example, information related to an individual's privacy, information which should not be open to the public for reasons of national security, and the like) at the time the original document is available for disclosure, so that such inappropriate information must be prevented from being disclosed and be removed from the disclosed document (i.e., sanitized). From a viewpoint of disclosure of such sanitized information in this case, even a change in an original document regarded as appropriate or essential results in "unsuccessful verification" as is the case with an original document tampered by a malicious third party in the known digital signature technology.

Also, from a viewpoint of avoidance of an increase in network traffic, a smallest possible size is preferable for data required for guaranteeing the authenticity such as an digital signature.

Accordingly, a need exists for a new electronic document authentication guarantee technology which can not only guarantee the authenticity of a disclosed document but also delete information inappropriate for disclosure, and requires only a smaller data size.

Preferably, the electronic document authenticity guaranteeing technology in this embodiment has the following properties. Also, the technology preferably requires a smallest possible data size in addition to satisfying these properties. (Property 1) A disclosed document can be verified even if it includes a non-disclosed part, and the disclosed document is successfully verified if there is no alteration other than in the non-disclosed part. (Property 2) A disclosed document is unsuccessfully verified if any alteration is found in the disclosed document other than in sanitized parts of an original document. (Property 3) Information related to a non-disclosed part cannot be estimated from a disclosed document. (Property 4) A disclosed document cannot be utilized by attackers who attempt to estimate information in a non-disclosed part of a disclosed document as information which guarantees the validity for the result of the estimation. (Property 5) A disclosed document can be inhibited from further being sanitized. (Property 6) A disclosed document creator can select whether further sanitizing on a disclosed document is permitted or inhibited.

The aforementioned Property 1 cannot be achieved by the known digital signature technology, but is required if any (appropriate) modification is made to an original document, after it has been created, as is the case with the information disclosure.

The aforementioned Property 2 constitutes a condition for distinguishing permitted appropriate alterations (i.e., sanitized) from other alterations.

The aforementioned Property 3 means that no information should leak from a non-disclosed part (sanitized part). For example, if an original document is opened to the public after information in its non-disclosed part is concealed (encrypted) by cryptography or the like, the encrypted information must not be readily decrypted.

The aforementioned Property 4 means that even if a non-disclosed part (sanitized part) is estimated, the estimation can be denied. For example, when an original document states "suspect A denied a criminal act," while a disclosed document states "suspect ★★★★ denied a criminal act" (i.e., a disclosed document creator concealed the designation of "A" which is personal information). Assume that an attacker (including a recipient) who viewed this disclosed document estimates that "★★★★" is "A" from the context or other information or the like, and preliminarily substitutes the name of "A" into the "★★★★" part for attempting a verification. If this verification is successful, the disclosed document is likely to be utilized as information which guarantees the result of the estimation that "★★★★" is "A." This is because it is difficult to deny that "★★★★" is "A" if a signature method allows a character string which would result in successful verification to be found with a virtually neglectably low probability when a character string other than "A" is substituted into "★★★★".

The aforementioned Property 5 is provided for preventing the following fraudulence. For example, in the information disclosure system illustrated in FIG. 1, if a disclosed document sent from the disclosed document creator device 104 to the recipient device 105 can be altered on the network 101, an unjust person can send the disclosed document to the recipient device 105 after the unjust person has deleted information inconvenient to him, i.e., additionally sanitized such information included in the disclosed document. In this event, the recipient cannot distinguish the originally disclosed document from the disclosed document additionally sanitized by the unjust person (because either of them can be confirmed to be part of the original document). This cannot be said to be desirable from the purpose essentially intended for freedom of information.

The aforementioned Property 6 is provided for some scenario in which certain part of a disclosed document should be prevented from being additionally sanitized, but another certain part may be permitted to be additionally sanitized. It should be noted that when Property 6 is satisfied, Property 5 is also satisfied because a disclosed document can be prevented from additionally being sanitized if a disclosed document creator sets to prevent the entire disclosed document from being additionally sanitized.

This embodiment provides a method which can be applied as an electronic document authenticity guarantee technology which fully satisfies the aforementioned properties.

For describing how to implement the electronic document authenticity guarantee technology, a detailed description will be given of the signature generation program 222 which runs on the original document creator device 102, the disclosed document creation program 230 which runs on the disclosed document creator device 104, and the disclosed document verification program 233 which runs on the recipient device 105.

In the following, a hash function is utilized. The hash function utilized in this embodiment "is applied with data of an arbitrary length and outputs data of a fixed length, and is characterized in that (1) the original input cannot be calculated from the output (one-way), and (2) two inputs which give the same output cannot be found (collision-free)." Specific examples of such hash functions known in the art include SHA-1, SHA-256, 384, 512, and MD5.

FIG. 5 is a flow diagram illustrating a processing flow of the signature generation program 222 in accordance with a first embodiment. The program 222 starts at step 501, and divides an original document into components (hereinafter called "blocks") (502). The components may be determined, for example, on a byte-by-byte basis from the head of the original document. Alternatively, when the original document is a previously structured document such as a document described using XML (extensible Markup Language), its minimal component may be utilized. In the following, the original document is regarded as a sequence of N blocks. A random number R is generated (503). A random number is generated for each of the N blocks, which make up the original document, in accordance with a tree structure using a pseudo-random number generator, using R as a seed (504). A method of generating random numbers in accordance with a tree structure will be described later in greater detail. For each of the N blocks, block data is concatenated with the random number generated therefor to generate data (called "random numbered block") (505). N hash values $X\_i$ are calculated using the hash function for the N random numbered blocks, respectively (called "random numbered block hash") (506). One hash value X is calculated in accordance with the tree structure from the N random numbered block hashes using the hash function (507). A method of calculating one hash value in accordance with the tree structure will be described later in greater detail. A random number S is generated (508). Like step 504, a random number is generated for each of the N blocks, which make up the original document, in accordance with the tree structure, with S used as a seed (509). This is called the "mask block" (a total of N mask blocks are generated). N hash values $Y\_i$ are generated for the N mask blocks, respectively, using the hash function (called the "mask block hash") (510). Like block 507, one hash value Y is calculated from the N mask block hashes in accordance with the tree structure using the hash function (511). A signature SIG is generated for data X∥Y, which is a concatenation of X and Y, using a secret key of the original document creator (512). Data comprised of R, S, original document, and signature SIG is provided as a signed original document. The program terminates at 514.

Figure 8:
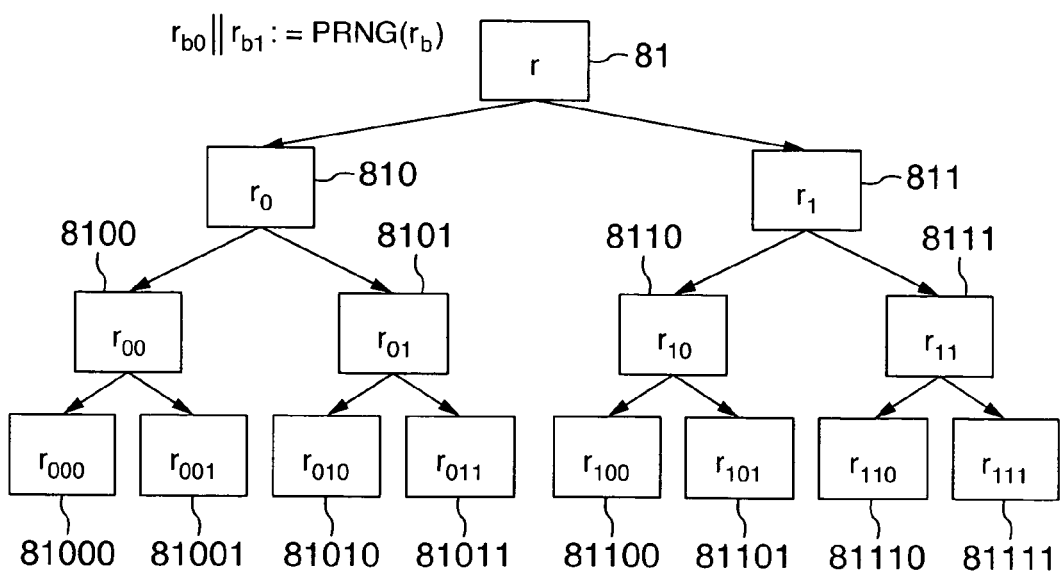
FIG. 8 is a diagram schematically illustrating a method of generating random numbers in the process of the disclosed document creation program 230 in accordance with the embodiment.

The method of generating the random numbers in accordance with the tree structure, described at step 504, 509, will be detailed below. FIG. 8 schematically illustrates a random number generation procedure. Assume that PRNG designates a pseudo-random number generator for generating a random number which has a length twice as long as the length of an input. An output generated when $r\_\{b\}$ is inputted is represented by $r\_\{b0\}\|r\_\{b1\}=RPNG(r\_\{b\})$, where b represents a character string having an arbitrary length and comprised of 0's and 1's (the same is applied in the following), and "b0" and "b1" represent character strings b concatenated with the character "0" and "1," respectively. In the following description, a character string b may be regarded as identical to a numerical value when b is represented in binary notation. Specifically, for example, a character string "0101" is regarded as identical to the value of 5. First, $r\_0$ (810) and $r\_1$ (811) are generated from r(81) using RPNG. Next, $r\_00$ (8100), $r\_01$ (8101), $r\_10$ (8110), and $r\_11$ (8111) are generated from $r\_0$ (810) and $r\_1$ (811). Similarly, PRNG is repeatedly applied in accordance with the tree structure (binary tree), and finally, $r\_000$ (81000)—$r\_111$ (81111) are generated. Following the foregoing procedure, N random numbers are generated from seed R (or S).

Figure 9:
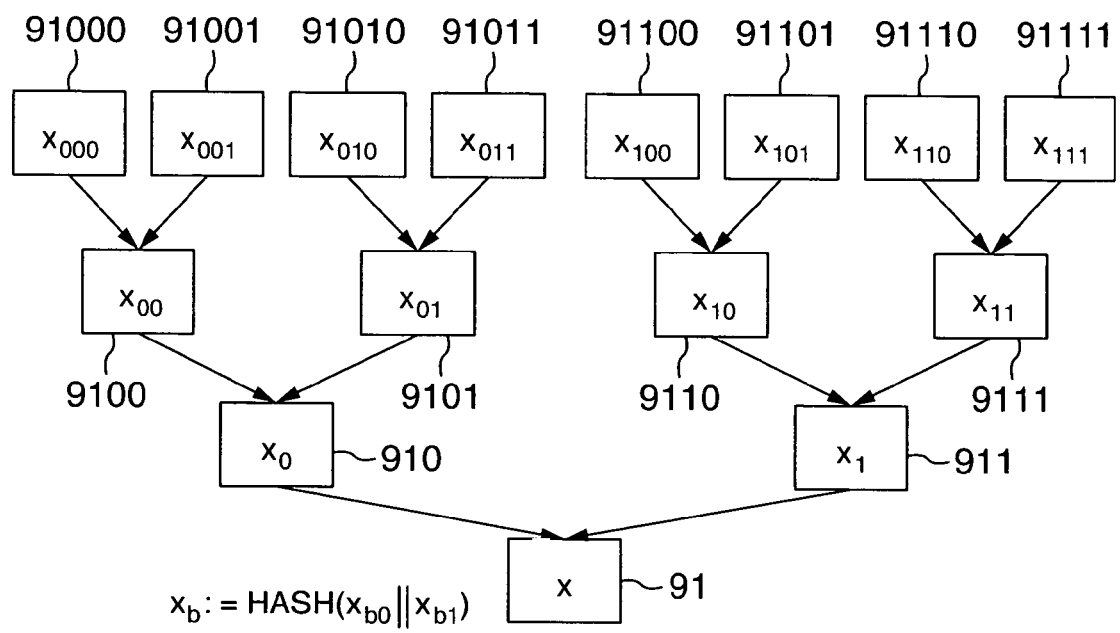
FIG. 9 is a diagram schematically illustrating a method of calculating a hash value in the process of the disclosed document creation program 230 in accordance with the embodiment.

The method of calculating one hash value in accordance with the tree structure, described at steps 507, 511, will be detailed below. FIG. 9 schematically illustrates a hash value calculation procedure. Assume that HASH represents the hash function, where $x\_\{b\}=HASH(x\_\{b0\}\|x\_\{b1\})$. First, N values $X\_000$ (91000)–$X\_111$ (91111) are inputted two by two to calculate $x\_00$ (9100)–$x\_11$ (9111) using HASH. Next, they are inputted two by two to calculate $x\_0$ (910), $x\_1$ (911) again using HASH. HASH is repeatedly applied in accordance with the tree structure (binary tree) to eventually calculate one hash value x (91). Following the foregoing procedure, a hash value X (or Y) is calculated from N random numbered block hashes $X\_i$ (or mask block hashes $Y\_i$).

The same hash function may be used, or a different hash function may be used at each of steps 506, 507, 510, 511 described above. When a plurality of hash functions are used, the disclosed document creation program and disclosed document verification program, later described, may use a plurality of hash functions corresponding thereto. When the same hash function is used, the implementation is advantageously facilitated. On the other hand, when different hash functions are used, fragility found in any hash function would exert adverse affection that could be localized.

FIGS. 6A, 6B are diagrams illustrating a processing flow of the disclosed document creation program 230 in accordance with the first embodiment. The program 230 starts at 601. A signed original document, which is to be disclosed, is searched for blocks including information inappropriate for disclosure (non-disclosed block) (602). It is determined whether each of blocks other than those searched at 602 is "permitted to be additionally sanitized" (sanitizing permitted block) or "inhibited from being additionally sanitized" (sanitizing inhibited block) (603). An empty random number seed list is prepared (604). $R\_\{b\}=R$ is set (605). It is checked whether nor not a random number can be generated in correspondence to a non-disclosed block when random numbers are generated in accordance with the tree structure using $R\_\{b\}$ as a seed (606). If no random number can be generated, $R\_\{b\}$ is added to the random number seed list, followed by a transition of the program 230 to step 607. Conversely, if a random number can be generated, the check at step 606 is made for both of $R\_\{b\}=R\_\{b0\}$ and $R\_\{b\}=R\_\{b1\}$. An empty mask seed list is prepared (607). $S\_\{b\}=S$ is set (608). It is checked whether or not a random number can be generated in correspondence to a sanitizing inhibited block when random numbers are generated in accordance with the tree structure using $S\_\{b\}$ as a seed (609). If no random number can be generated, $S\_\{b\}$ is added to the mask seed list, followed by a transition of the program to step 610. If a random number can be generated, the check at step 609 is made for both S_{b}=S_{b0} and S_{b}=S_{b1}. An empty hash value list is prepared for random numbered blocks (610). If the random number seed R_{b0} is included but R_{b1?} is not included in the random number seed list ("?" represents an arbitrary character string having one or more characters and consisting of "0" or "1"), X_{b1} is calculated from the random numbered block hashes using the hash function, and added to the hash value list for random numbered blocks. If the random number seed R_{b1} is included but R_{b0?} is not included in the random number seed list ("?" represents an arbitrary character string having one or more characters and consisting of "0" or "1"), X_{b0} is calculated from the random numbered block hashes using the hash function, and added to the hash value list for random numbered blocks (611). It should be noted that X_{b1} and X_{b0} can be calculated from a signed message in a manner similar to the generation of a signature. An empty hash value list is prepared for mask blocks (612). If the random number seed S_{b0} is included but S_{b1?} is not included in the mask seed list ("?" represents an arbitrary character string having one or more characters and consisting of "0" or "1"), Y_{b1} is calculated from mask block hashes using the hash function, and added to the hash value list for mask blocks. If the random number seed S_{b1} is included but S_{b0?} is not included in the mask seed list ("?" represents an arbitrary character string having one or more characters and consisting of "0" or "1"), Y_{b0} is calculated from mask block hashes using the hash function, and added to the hash value list for mask blocks (613). It should noted that Y_{b1} and Y_{b0} can be calculated from a signed message in a manner similar to the generation of a signature. Data comprised of the original document, from which the non-disclosed blocks have been removed, values included in the random number seed list, values included in the mask seed list, values included in the hash value list for random numbered blocks, values included in the hash value list for mask blocks, and a signature is outputted as a disclosed document (614). The program terminates at 615.

Figure 7:
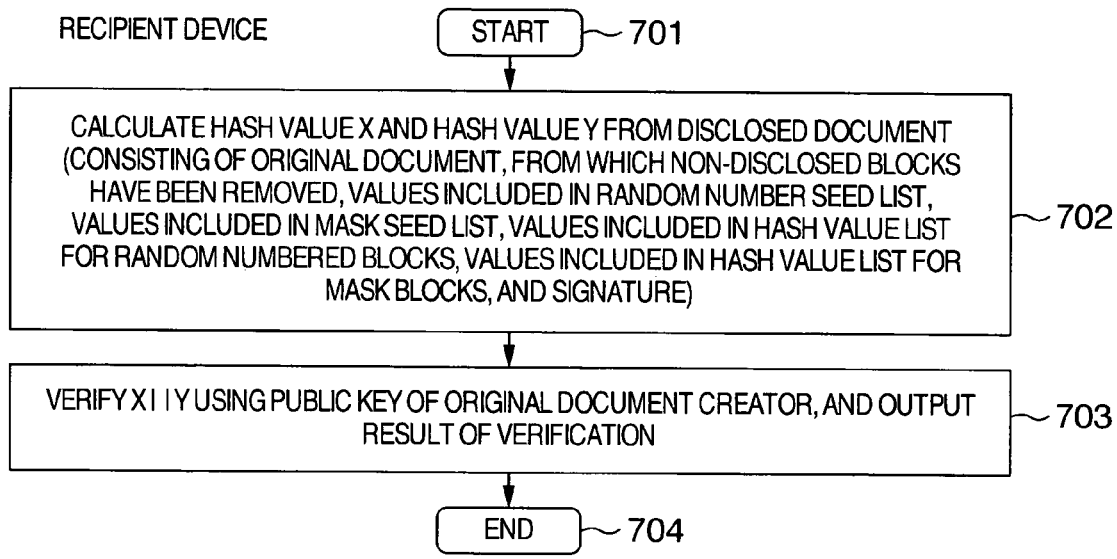
FIG. 7 is a diagram illustrating a processing flow of a disclosed document verification program 233 in accordance with the embodiment.

FIG. 7 is a diagram illustrating a processing flow of the disclosed document verification program 233 in accordance with the first embodiment. The program 233 starts at 701, and a hash value X and a hash value Y are calculated from a disclosed document (comprised of an original document, from which no-disclosed blocks have been removed, values included in the random number seed list, values included in the mask seed list, values included in the hash value list for random numbered blocks, values included in the hash value list for mask blocks, and a signature) (702). A method of calculating the hash value X and hash value Y will be described later in detail. X∥Y is verified using a public key of an original document creator to output the result of the verification (703). The public key of the original document creator for use in the verification may be, for example, sent from the disclosed document creator device 104 together with the disclosed document, or may be made available as required from the original document creator device 102. The public key is preferably issued by applying the known PKI (Public-key infrastructure) technology, and is appended with a public key certificate which makes it possible to confirm that the public key is certainly owned by the original document creator, and is available. The program terminates at 704.

The hash value X and hash value Y may be calculated at step 702 in the following manner. First, a random number corresponding to a disclosed block (i.e., either a sanitizing permitted block or a sanitizing inhibited block) is calculated from values included in the random number seed list in accordance with a tree structure, and a random numbered block is made up of the random number and disclosed block. Further, a random numbered block hash is calculated from the random numbered block using the hash function. Next, the hash value X is calculated from the random numbered block hashes in accordance with the tree structure, in a manner similar to the generation of a signature. However, unlike the generation of a signature, values in the hash list for random numbered blocks are used instead of random numbered block hashes corresponding to non-disclosed blocks. Likewise, the hash value Y is calculated using the mask seed list instead of the random number seed list, and the hash value list for mask blocks instead of the hash list for random numbered blocks. In course of the foregoing procedure, it is confirmed that corresponding random numbers can be calculated for disclosed blocks, and corresponding mask blocks can be calculated for non-disclosed blocks or sanitizing permitted blocks. If the confirmation cannot be made, a failed verification is outputted (it can be confirmed that these blocks can be calculated for a disclosed document which has been created in accordance with the signature generation process illustrated in FIG. 5 and the disclosed document creation process illustrated in FIG. 6).

Figure 10:
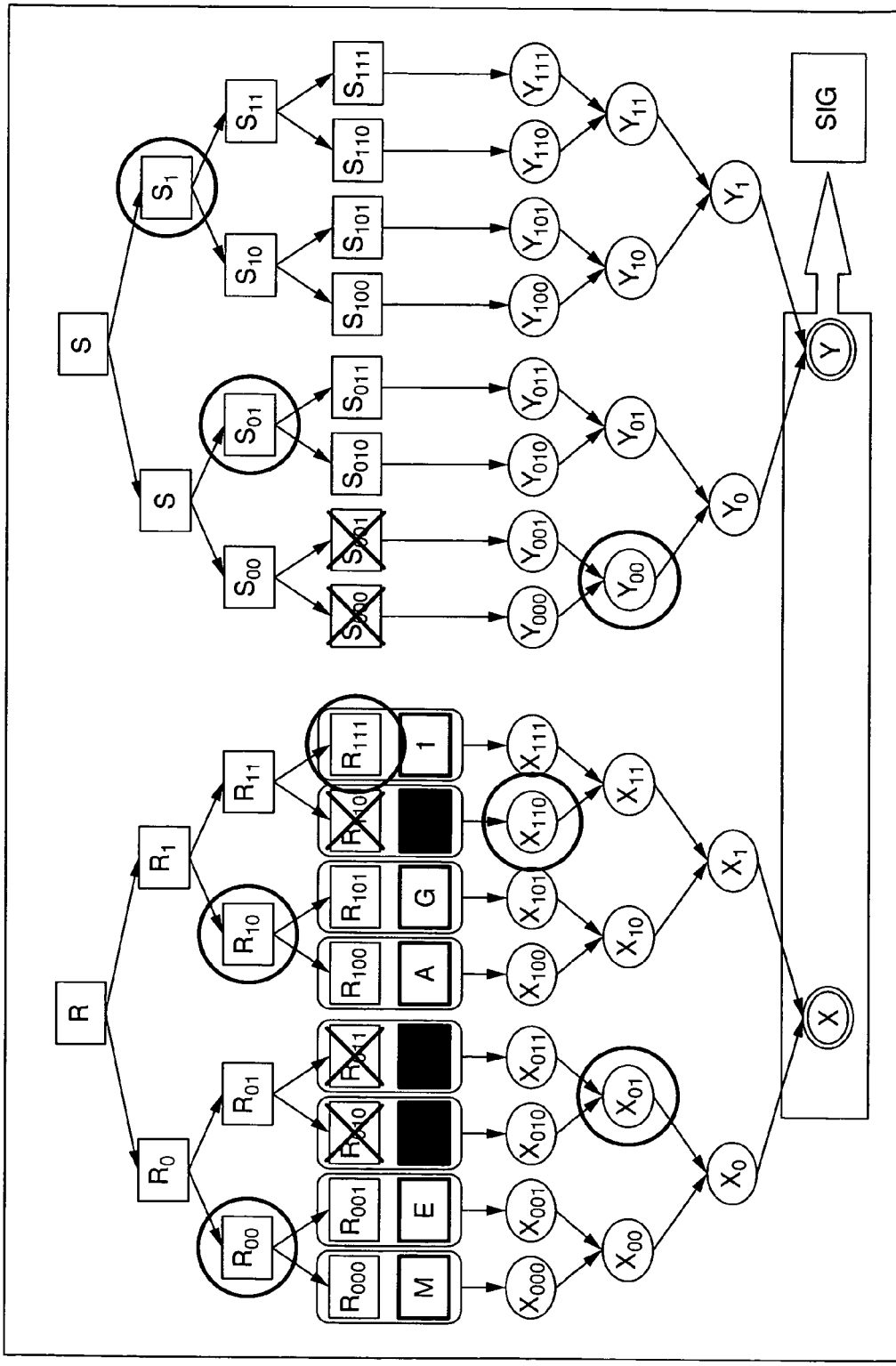
FIG. 10 is a diagram schematically illustrating the composition of a disclosed document in accordance with the embodiment.

FIG. 10 is a diagram schematically illustrating the composition of a disclosed document 108 which has been created in accordance with the procedure shown in this embodiment. Specifically, FIG. 10 shows that within a signed original document generated by signing (SIG) an original document "MESSAGE1" (assume that the original document is comprised of eight blocks each of which consists of one character), the third, fourth, and seventh characters "S," "S," "E" are not disclosed, and the first and second characters "M," "E" are set to be sanitizing inhibited. Here, the random number seed list included in the disclosed document includes three values: R_00, R_10, R_111 and the mask seed list includes two values: S_1, S_01. On the other hand, the hash value list for random numbered blocks includes two values: X_01, X_110, and the hash value list for mask blocks includes Y_00. It is extremely difficult, or virtually impossible to calculate random numbers marked with "X" in FIG. 10 from these values.

Now, a description will be given that the electronic document authentication guarantee technology described above satisfies the aforementioned (Property 1)-(Property 6).

In this embodiment, a disclosed document is comprised of an original document, from which non-disclosed blocks have been removed, values included in the random number seed list, values included in the mask seed list, values included in the hash value list for random numbered blocks, values included in the hash value list for mask blocks, and a signature. In the foregoing description on the verification procedure, it has already been discussed that (Property 1) is satisfied.

Also, the collision-free nature of the hash function results in difficulties in making alterations other than replacement of blocks in an original document with hash value blocks. Accordingly, (Property 2) is also satisfied.

Information, included in a disclosed document, which depends on information inappropriate for disclosure includes only hash values associated with blocks inappropriate for disclosure, and a signature which is generated depending on the hash values. Accordingly, it is understood that from the one-way nature of the hash function, (Property 3) is satisfied.

Further, an attacker, who has estimated blocks inappropriate for disclosure from the context and the like, would experience difficulties in checking whether or not the estimation is correct by comparing hash values. It is because, even supposing that information of estimated blocks is correct, hash values do not match unless correct random numbers are concatenated thereto. Also, since random numbers are generated irrespective of the context and the like, it is extremely difficult, or virtually impossible to estimate random numbers. Accordingly, this embodiment also satisfies (Property 4).

According to the method shown in this embodiment, whether a certain block is set to be sanitizing permitted or sanitizing inhibited can be made by enabling a mask block to be generated corresponding to that block or not. Also, when a mask block cannot be generated corresponding to a certain block, i.e., when a disclosed document is generated so as not to include a seed value for generating a random number which is the value of the mask block, it is difficult to estimate the value of the mask block due to the one-way nature of the hash function. Accordingly, (Property 5) and (Property 6) are also satisfied.

Further, according to the method shown in this embodiment, the data size can be reduced, as compared with the method disclosed in known Document 5. This is because the method disclosed in Document 5 gives random values required to constitute random numbered blocks and mask blocks, as a disclosed document, individually to each block, whereas the method shown in this embodiment gives seed values for generating (a plurality of) required random numbers. Also, the method disclosed in Document 5 gives random numbered block hashes and mask block hashes, as a disclosed document, individually to each block, whereas the method shown in this embodiment gives hash values which have been collected in accordance with a tree structure using a hash function.

While the foregoing embodiment has been described in connection with the freedom of information system, given as an example, the present invention is not limited to this system.

While the foregoing embodiment has shown an example in which the technology for guaranteeing the authenticity of an electronic document is built on the basis of the digital signature technology, the authenticity of an electronic document may be guaranteed by a different strategy. For example, if a reliable third party organization exists, an original document creator may have previously deposited an original document (or associated hash values and the like) in a third party organization device, such that a recipient queries the third party organization device for the authenticity of a disclosed document. Even in this strategy, the technology described in the foregoing embodiment can be applied for guaranteeing the authenticity. For example, data to be signed in each method (i.e., data other than a signature in a signed original document) may be deposited in the third party organization device.

Also, while the foregoing embodiment has been mainly described in connection of an original document, given as an example, which is comprised of component blocks arranged in sequence, the original document may take a different composition. For example, when an original document is described using a structured document format such as XML (extensible Markup Language) or the like, the original document can be regarded as having a hierarchical relationship among respective components. Specifically, when a start tag and an end tag having an element name B are included in a region surrounded by a start tag and an end tag having an element name A, A can be regarded as a parent element of B. When there is such a hierarchical structure, the electronic document authenticity guarantee technology may be designed in accordance with the hierarchical structure.

Further, in the exemplary embodiment shown above, an original document is divided into components which do not have a common part to one another (step 502) to generate a signature. Alternatively, an original document may be divided into components which have a common part. The technology described in the foregoing embodiment can be applied to this strategy as well.

In the foregoing embodiment, non-disclosed parts are sanitized, i.e., disclosed in a blotted-out state, however, non-disclosed parts may be concealed by other methods.

While the foregoing embodiment has been described in connection with administrative documents, the present invention is not limited to such particular documents, but can be applied to a variety of documents in which appropriate alterations are desired to signed parts after the documents have been signed.

Not limited to electronic documents, the present invention can also be applied more generally to digital data such as image data, animation data, music data and the like. In this event, blocks may be set as appropriate in accordance with the structure of particular digital data.

The present invention is not limited to the embodiment described above. Those skilled in the art could make a variety of additions, modifications and the like within the scope of the present invention.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. An electronic document authenticity guarantee system including a creator device, a censor device, and a verifier device, wherein each of the creator device, the censor device, and the verifier device is a computer including a CPU and a memory, and the CPU in each device executes a program stored in the memory in each device, wherein the creator device includes a first pseudo-random number generator and a signature generating processor, the signature generating processor:

dividing an electronic document to be guaranteed into a plurality of components;

generating a first random number seed value;

generating a concealment random number from the first random number seed value for each of the plurality of components using the first pseudo-random number generator;

concatenating the concealment random number to each of the plurality of components;

calculating a plurality of first hash values for the respective components to which the concealment random number has been concatenated using a first cryptographic hash function;

generating a first data from the plurality of first hash values using a second cryptographic hash function;

generating a second random number seed value different from the first random number seed value;

generating a plurality of mask data random numbers from the second random number seed value for the respective components using the first pseudo-random number generator;

calculating a plurality of second hash values for the respective mask data random numbers using a third cryptographic hash function;

generating a second data from the plurality of second hash values using a fourth cryptographic hash function;

applying a digital signature to the first data and the second data using a private key of a user of the creator device; and generating a document to be disclosed including the electronic document to be guaranteed, the first data, the second data, the digital signature, the first random number seed value, and the second random number seed value, wherein the censor device includes a second pseudo-random number generator, a disclosed component determining unit, and a disclosed document generator, the disclosed component determining unit sets one of non-disclosure, disclosure and sanitizing prohibited, and disclosure and sanitizing allowed, to each of the components to be guaranteed in the document to be disclosed, the document being generated by the creator device, and the disclosed document generator generates a disclosed document including:

one or a plurality of third random number seed values from which concealment random numbers corresponding to components which have been set to disclosure and sanitizing prohibited or disclosure and sanitizing allowed can be generated, but concealment random numbers corresponding to components which have been set to non-disclosure cannot be generated without the first random number seed value;

one or a plurality of fourth random number seed values from which mask data random numbers corresponding to components which have been set to non-disclosure or disclosure and sanitizing allowed can be generated, but mask data random numbers corresponding to components which have been to set to disclosure and sanitizing prohibited cannot be generated without the second random number seed value;

a third hash value calculated from one or a plurality of concatenations using the first cryptographic hash function, each of the concatenations being made by concatenating a component set to non-disclosure with a corresponding concealment random number generated from the first random number seed value;

a fourth hash value calculated from one or a plurality of the mask data random numbers corresponding to the components set to disclosure and sanitizing prohibited using the third cryptographic hash function, the mask data random numbers being generated from the second random seed value;

components which have been set to disclosure and sanitizing prohibited, and components which have been set to disclosure and sanitizing allowed; and the digital signature, and wherein the verifier device includes a disclosed document verifier:

generating the concealment random number for each of the components set to disclosure and sanitizing prohibited or the components set to disclosure and sanitizing allowed in the disclosed document from the third random number seed values in the disclosed document;

concatenating respectively the generated concealment random numbers to the corresponding components set to disclosure and sanitizing prohibited or the components set to disclosure and sanitizing allowed;

calculating a third data from fifth hash values and the third hash values included in the disclosed document using the second cryptographic hash function, the fifth hash values calculated from the components set to disclosure and sanitizing prohibited or disclosure and sanitizing allowed to which the concealment random numbers are concatenated using the first cryptographic hash function;

generating a mask data random number for each of the components set to non-disclosure or disclosure and sanitizing allowed of the disclosed document from the fourth random number seed values included in the disclosed document;

calculating a fourth data from sixth hash values calculated from the generated mask data random numbers using the third cryptographic hash function and the fourth hash values included in the disclosed document, using a fourth cryptographic hash function; and verifying the digital signature using a public key paired with the private key, the third data and the fourth data to guarantee the authenticity of the disclosed document.

2. The electronic document authenticity guarantee system according to claim 1, wherein:

the second pseudo-random number generator of the creator device generates random numbers which have a length twice as long as the length of an input, and the creator device:

(a) generates twice length random numbers from one or more first random number seed values using the second pseudo-random number generator;

(b) divides each of the generated twice length random numbers into halves to make halves new first random number seed values;

(c) if the number of the first random number seed values does not reach the number of components in step (b), returns to step (a);

(d) if the number of the first random number seed values reaches the number of components in step (b), makes each of the first random number seed values be the concealment random number, (e) generates twice length random numbers from one or more second random number seed values using the second pseudo-random number generator;

(f) divides each of the generated twice length random numbers into halves to make halves new second random number seed values;

(g) if the number of the second random number seed values does not reach the number of components in step (f), returns to step (e); and (h) if the number of the second random number seed values reaches the number of components in step (f), makes each of the second random number seed values be the mask data random number.

3. The electronic document authenticity guarantee system according to claim 1, wherein the creator device makes each of the first hash values be a first calculation target by:

(i) making each two of first calculation targets be a second calculation target;

(j) inputting the second calculation target into the second cryptographic hash function and obtains a hash value having the same length as the first calculation target to make the obtained hash value be a new first calculation target;

(k) if the number of the first calculation targets is more than one in step (j), returning to step (i); and (l) if the number of the first calculation target is one in step (j), making the first calculation target be the first data, and the creator device makes the second hash value be the third calculation target by:

(m) making each two of third calculation targets be a fourth calculation target;

(n) inputting the fourth calculation target into the fourth cryptographic hash function and obtains a hash value having the same length as the third calculation target to make the obtained hash value be a new third calculation target;

(o) if the number of the third calculation target is more than one in step (n), returning to step (m); and (p) if the number of the third calculation target is one in step (n), making the third calculation target be the second data.

4. The electronic document authenticity guarantee system according to claim 1, wherein the first cryptographic hash function, the second cryptographic hash function, the third cryptographic hash function, and the fourth cryptographic hash function are the same function.

* * * * *